US012526356B2

(12) United States Patent
Lombardi et al.

(10) Patent No.: US 12,526,356 B2
(45) Date of Patent: Jan. 13, 2026

(54) FLEXIBLE ELECTRICAL INTER-ASSEMBLY COUPLING CIRCUIT FOR FOLDABLE DEVICES

(71) Applicant: Google LLC, Mountain View, CA (US)

(72) Inventors: Michael J. Lombardi, South Barrington, IL (US); Joe Allore, Mundelein, IL (US)

(73) Assignee: Google LLC, Mountain View, CA (US)

(*) Notice: Subject to any disclaimer, the term of this patent is extended or adjusted under 35 U.S.C. 154(b) by 304 days.

(21) Appl. No.: 18/546,180

(22) PCT Filed: Apr. 14, 2021

(86) PCT No.: PCT/US2021/027244
§ 371 (c)(1),
(2) Date: Aug. 11, 2023

(87) PCT Pub. No.: WO2022/177588
PCT Pub. Date: Aug. 25, 2022

(65) Prior Publication Data
US 2024/0121330 A1 Apr. 11, 2024

Related U.S. Application Data (60) Provisional application No. 63/151,292, filed on Feb. 19, 2021.

(51) Int. Cl.
*H04M 1/02* (2006.01)
(52) U.S. Cl.
CPC ....... *H04M 1/0216* (2013.01); *H04M 1/0269* (2022.02); *H04M 1/0277* (2013.01); *H04M 1/0283* (2013.01)
(58) Field of Classification Search
CPC ............. H04M 1/0216; H04M 1/0269; H04M 1/0277; H04M 1/0283; H04M 1/0268;
(Continued)

(56) References Cited

U.S. PATENT DOCUMENTS 5,278,725 A * 1/1994 Konno .................. G06F 1/1616
439/165
10,505,147 B2 12/2019 Lee
(Continued)

FOREIGN PATENT DOCUMENTS

| KR | 20190041252 A | 4/2019 |
| KR | 20200101201 A | 8/2020 |
| KR | 20200108754 A | 9/2020 |

OTHER PUBLICATIONS

Notice of Intent to Grant and Text Intended to Grant from counterpart European Application No. 21723825.2 dated Mar. 20, 2024, 9 pp.
(Continued)

*Primary Examiner* — Angelica Perez
(74) *Attorney, Agent, or Firm* — Shumaker & Sieffert, P.A.

(57) ABSTRACT

A foldable computing device may comprise a top housing assembly, a bottom housing assembly, and a flexible electrical inter-assembly coupling circuit. The top housing assembly may house a first subset of electrical component. The bottom housing assembly is mechanically coupled to the top housing assembly such that the top housing assembly is operable to cover, when closed, at least a portion of the bottom housing assembly. The bottom housing assembly may also house a second subset of the electrical components. The flexible electrical inter-assembly coupling circuit may electrically couple the first subset of the electrical components and the second subset of the electrical components. The flexible electrical intercoupling circuit configured may remain flat when the top housing assembly is open relative to the bottom housing assembly and flex when the top housing assembly is at least partially closed relative to the bottom housing assembly.

17 Claims, 5 Drawing Sheets

(58) Field of Classification Search
CPC ... H04M 1/0214; H05K 1/0283; H05K 1/148; H05K 2201/0979; H05K 1/028; H05K 1/118; G06F 1/1616; G06F 1/1652; G06F 1/1683
See application file for complete search history.

(56) References Cited

U.S. PATENT DOCUMENTS

| | | | |
|---|---|---|---|
| 10,739,908 B2 | 8/2020 | Franklin et al. | |
| 10,820,425 B2 | 10/2020 | Chu et al. | |
| 11,113,996 B2 | 9/2021 | Kim et al. | |
| 11,304,300 B2 | 4/2022 | Woo et al. | |
| 2006/0089182 A1* | 4/2006 | Gartrell | H04M 1/0216 455/575.3 |
| 2010/0330338 A1* | 12/2010 | Boyce | H01L 23/4985 428/156 |
| 2013/0083496 A1* | 4/2013 | Franklin | G06F 3/044 361/752 |
| 2015/0141784 A1* | 5/2015 | Morun | G06F 3/014 427/79 |
| 2015/0277496 A1 | 10/2015 | Reeves et al. | |
| 2015/0282295 A1 | 10/2015 | Matsumoto et al. | |
| 2020/0094466 A1* | 3/2020 | Vachicouras | B32B 27/36 |
| 2020/0170127 A1 | 5/2020 | Kim | |
| 2020/0267839 A1* | 8/2020 | Woo | G06F 1/1681 |
| 2020/0294428 A1* | 9/2020 | Kim | G06F 1/1637 |
| 2020/0319672 A1* | 10/2020 | Kim | H04M 1/0268 |
| 2021/0185803 A1* | 6/2021 | Qin | H05K 1/0283 |
| 2023/0073303 A1* | 3/2023 | Bailey | G04G 17/04 |

OTHER PUBLICATIONS

Response to Communication Pursuant to Rules 161(1) and 162 EPC dated Aug. 25, 2023, from counterpart European Application No. 21723825.2, filed Feb. 15, 2024, 31 pp.

International Search Report and Written Opinion of International Application No. PCT/US2021/027244, dated Nov. 24, 2021, 14 pp.

Office Action, and translation thereof, from counterpart Korean Application No. 10-2023-7030601 dated Jan. 13, 2025, 18 pp.

Response to Office Action, and translation thereof, dated Jan. 13, 2025, from counterpart Korean Application No. 10-2023-7030601 filed Mar. 11, 2025, 60 pp.

Notice of Intent to Grant, and translation thereof, from counterpart Korean Application No. 10-2023-7030601 dated Aug. 4, 2025, 3 pp.

* cited by examiner

FLEXIBLE ELECTRICAL INTER-ASSEMBLY COUPLING CIRCUIT FOR FOLDABLE DEVICES

This application claims the benefit of U.S. Provisional Application Ser. No. 63/151,292, filed Feb. 19, 2021, the entire contents of which are hereby incorporated by reference.

BACKGROUND

Mobile computing devices, such as cellular phones (including so-called smartphones), smartwatches, portable gaming devices, laptops, and the like, may operate on portable power supplies that enable mobile computing while disconnected from a constant power source. Such mobile computing devices may include a display, which consumes significant power (relative to other components of the mobile computing device) in order to display content for consumption by users. This consumption of power by the display has limited display size to allow for a full day of use via the portable power supply (without mid-day charging via a constant power source). As portable power supplies (e.g., rechargeable lithium-ion batteries) have improved in power storage capacity while improvements in display panel technology (e.g., a transition from light emitting diodes—LED—displays to organic LED—OLED—displays) has reduced power consumption, mobile computing devices have begun to feature larger displays to improve the mobile computing experience for users.

However, users may prefer a portable design for mobile computing devices that allow the mobile computing devices to be easily carried (e.g., in a pocket, a small bag, etc.). As such, designers of mobile computing devices have begun to experiment with foldable designs of mobile computing devices using flexible displays that are configured to fold in half, thereby providing a portable design with a significantly larger screen (compared to standard non-foldable computing devices as the foldable mobile computing devices allow for up to twice the display size). These foldable mobile computing devices may include a top housing assembly mechanically coupled, via a folding mechanism, to a bottom housing assembly, where the folding mechanism allows the top housing assembly to close relative to the bottom housing assembly, thereby providing a foldable mobile computing device having up to twice the display size compared to non-foldable computing devices as the display of the foldable mobile computing device may span both the top and bottom housing assemblies.

SUMMARY

In general, aspects of this disclosure are directed to folding mobile computing devices that include two or more housing assemblies configured to fold, via a mechanical folding mechanism, such that a top housing assembly may close relative to a bottom housing assembly. Each of the housing assemblies may include a subset of electrical components, which are electrically coupled to each other via a circuit (e.g., a printed circuit board—PCB). Rather than include a PCB (for interconnecting the subsets of electrical components in both housing assemblies) that is sufficiently wide enough to accommodate folding around the folding mechanism when closed (as the curvature around the folding mechanism requires additional length for the PCB compared to a PCB that could be used when the foldable mobile computing device is open), the folding mobile computing device may include a flexible PCB that flexes (or, in other words, stretches) to accommodate the fold around the folding mechanism.

By avoiding use of a PCB that is wide enough to accommodate the folding mechanism, the foldable mobile computing device may not have to accommodate the extra width required to span the folding mechanism when folding. Removal of the excess length may increase storage capacity in one or both of the housing assemblies that can be used for components (such as providing increased storage capacity for a larger battery). Furthermore, removing the extra width may reduce areas in which particulates (such as water, dust, etc.) may enter one or both housing assemblies. Moreover, removing the extra width may improve user interactions with the device as support structures of the folding mechanism that support portions of the display located over the folding mechanism may not have to accommodate the extra width and thereby may present a more uniform surface that does not include weak spots along the axis of the folding mechanism.

In one example, various aspects of the techniques described in this disclosure are directed to a device comprising: a top housing assembly configured to house a first subset of a plurality of electrical components; a bottom housing assembly mechanically coupled to the top housing assembly such that the top housing assembly is operable to cover, when closed, at least a portion of the bottom housing assembly, the bottom housing assembly configured to house a second subset of the plurality of electrical components; and a flexible electrical inter-assembly coupling circuit configured to electrically couple the first subset of the plurality of electrical components and the second subset of electrical components, the flexible electrical intercoupling circuit configured to remain flat when the top housing assembly is open relative to the bottom housing assembly and flex when the top housing assembly is at least partially closed relative to the bottom housing assembly.

The details of one or more examples are set forth in the accompanying drawings and the description below. Other features, objects, and advantages of the disclosure will be apparent from the description and drawings, and from the claims.

DETAILED DESCRIPTION

Figure 1:
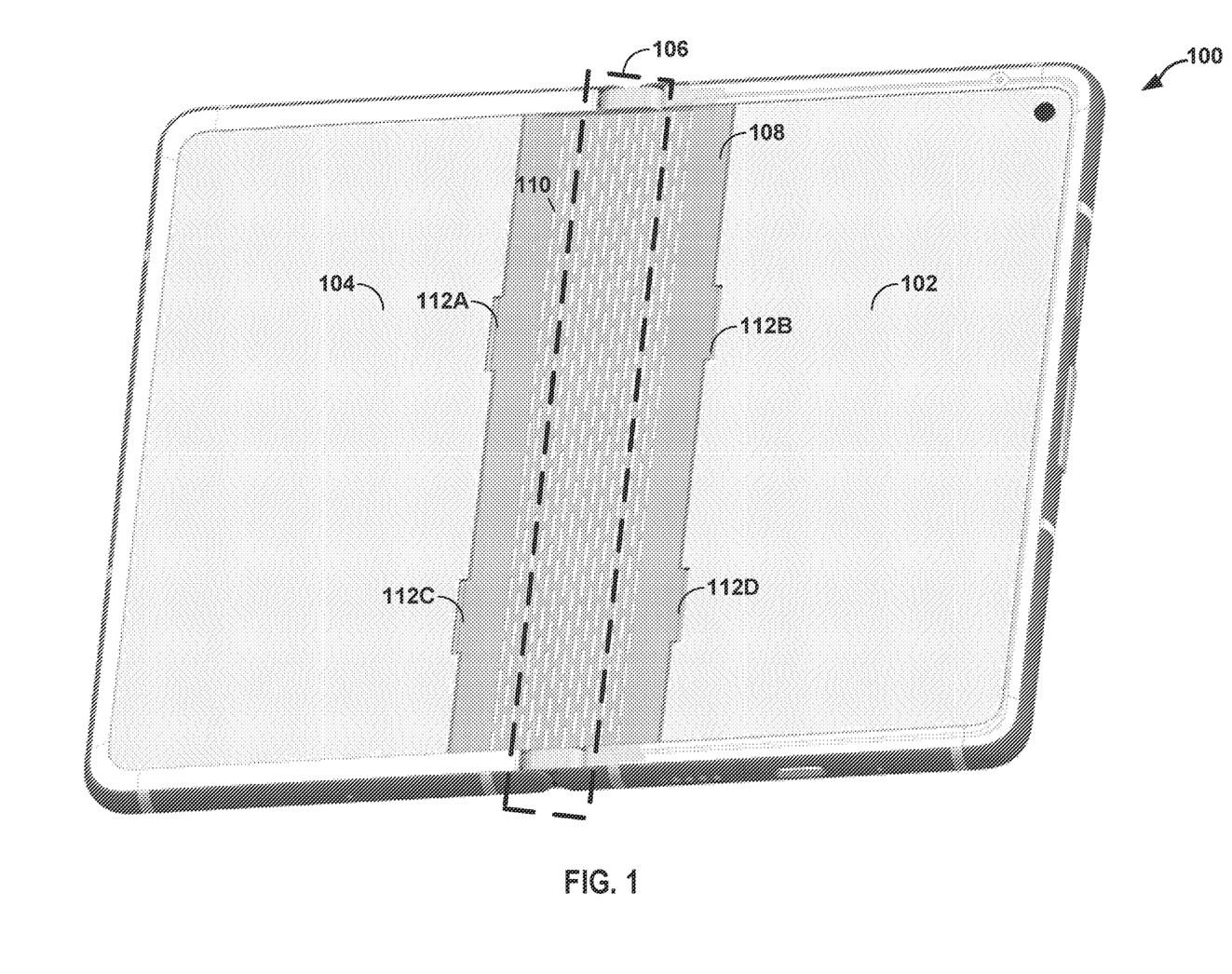
FIG. 1 is a schematic diagram illustrating a folding device with a hinge assembly integrated into the first and second assemblies of the folding device, in accordance with one or more aspects of this disclosure.

FIG. 1 is a diagram illustrating a foldable mobile computing device that includes a flexible electrical inter-assembly coupling unit according to various aspects of the techniques described in this disclosure. As shown in the example of FIG. 1, a foldable mobile computing device 100 includes a top housing assembly 102, a bottom housing assembly 104 and a mechanical folding mechanism 106, where bottom housing assembly 104 mechanically couples to top housing assembly via a mechanical folding mechanism 106.

While described in this disclosure with respect to a foldable smartphone, foldable mobile computing device 100 may represent any foldable device, including a smartwatch, a portable gaming system, a laptop computer, an electronic reading device (so-called "e-reader"), or any other mobile computing device capable of having an expanded display (including a rollable display in which the screen unrolls to expand the display). Moreover, while described with respect to a mobile foldable smartphone, various aspects of the techniques may apply to computer monitors, smart television, all-in-one computers, or any other computing device having an expandable display, but which may receive power from a fixed or constant power source and lacks a battery or other portable power source to enable mobile operation. However, for purposes of explanation, foldable mobile computing device 100 may represent a foldable smartphone and, as such, may be referred to herein as "foldable smartphone 100."

In any event, top housing assembly 102 may represent a housing assembly configured to house or otherwise secure a subset of electrical components that form foldable mobile computing device. Top housing assembly 102 may be formed from any suitable material, such as carbon fiber, plastic or other polymers, aluminum or other metals, glass, or combinations thereof. Generally, a housing assembly, such as top housing assembly 102, may refer to an exterior shell of the foldable mobile computing device, including any inner molding or other supports to house the subset of electrical components and physical inputs (e.g., buttons, sliders, ports, etc.) and/or provide outlets for outputs (e.g., speaker holes, microphone holes, camera openings, etc.). Bottom housing assembly 104 may be similar, if not substantially similar, to top housing assembly 102 in terms of material, and general form factor, but may differ in supports, cutouts, and molding to secure a different subset of the electrical components and inputs (e.g., buttons, sliders, ports—such as headphone ports, charging ports, and the like—etc.) and provide different outlets for outputs.

Folding mechanism 106 may represent a mechanical hinge that facilitates opening and closing of foldable smartphone 100 in which top housing assembly is operable to rotate around folding mechanism 106 in order to cover, when closed, at least a portion of the interior (which is the top face shown in the example of FIG. 1, where the exterior of housing assemblies 102/104 is not shown for ease of illustration) of bottom housing assembly 104 (and potentially cover the entirety of the interior of bottom housing assembly 104). Folding mechanism 106 may also facilitate opening of foldable smartphone 100 in which top housing assembly is operable to rotate around folding mechanism 106 to uncover at least the portion of bottom housing assembly 104. Although described with respect to top housing assembly 102 rotating around folding mechanism 106, one of or both top housing assembly 102 and bottom housing assembly 104 may rotate around folding mechanism 106.

Although not shown in the example of FIG. 1, foldable smartphone 100 may include a foldable (or in other words, flexible) display that covers at least a portion of top housing assembly 102 and at least a portion of bottom housing assembly 104. Foldable displays may include organic light emitting diode (OLED) displays, an active matrix OLED (AMOLED), or any other display capable of bending or otherwise flexing along an axis (e.g., a middle line of the display either length- or width-wise). Foldable display may be disposed, in some instances, over the entirety (or nearly the entirety considering bezels and other holes for placement of ports or other openings to accommodate the electrical components, such as a camera, a speaker, a microphone, a fingerprint reader, etc.) of the interior portion of both top housing assembly 102 and bottom housing assembly 104. The foldable display may bend or, in other words, flex so as to accommodate opening and closing of top housing assembly 102 relative to bottom housing assembly 104.

In addition, although not shown in the example of FIG. 1, foldable smartphone 100 may include a portable power source (e.g., a battery, such as a rechargeable lithium ion battery) that powers foldable smartphone 100 when disconnected from a constant, or continuous power source (such as a direct power supply provided by an electrical outlet). The portable power source may provide a constrained or, in other words, limited power supply to the electronic components of foldable smartphone 100. Such electronic components may include the foldable display, one or more sensors (e.g., a camera—including an infrared camera, an accelerometer, a gyroscope, a temperature sensor, a hygrometer, etc.), a fingerprint reader, a processor—including a graphical processing unit, a central processing unit, an application specific integrated circuit (ASIC), a field programmable gate array (FPGA), a digital analogue converter (DAC), a video compression processor, or any other processing circuitry, a memory or other storage device (including both volatile and non-volatile memory), or any other electrical component commonly included within smartphones or other computing devices.

In some instances, the display of smartphones may consume significant power (relative to other electrical components of a smartphone with potentially upwards of 50% of all power provided by the portable power supply consumed by the display). This consumption of power by the display has limited display size to allow for a full day of use via the portable power supply (without mid-day charging via a constant power source). As portable power supplies (e.g., rechargeable lithium-ion batteries) have improved in power storage capacity while improvements in display panel technology (e.g., a transition from light emitting diodes—LED—displays to organic LED—OLED—displays) has reduced power consumption, smartphones have begun to feature larger displays to improve the mobile computing experience for users.

However, users may prefer a portable design for smartphones that allow the smartphones to be easily carried (e.g., in a pocket, a small bag, etc.). As such, designers of smartphones have begun to experiment with foldable designs of smartphones using flexible displays that are configured to fold in half, thereby providing a portable design with a significantly larger screen (compared to standard non-foldable smartphones as foldable smartphone 100 allows for up to twice the display size). In this respect, foldable smartphone 100 may represent a foldable mobile computing device having up to twice the display size compared to non-foldable computing devices as the display of foldable smartphone 100 may span both top and bottom housing assemblies 102/104.

Although the foldable display of foldable smartphone 100 may present a large display for consumption of content by users, foldable smartphone 100 may present design challenges that impact user operation of foldable smartphone 100 as folding mechanism 106 may introduce a variety of different issues. For example, to interconnect the subset of electrical components housed in top housing assembly 102 to the subset of electrical components housed in bottom housing assembly 104, foldable smartphone 100 may include an electrical inter-assembly connecting circuit (e.g., a printed circuit board—PCB) that electrically couples the subsets of electrical components housed by top housing assembly 102 and bottom housing assembly 104. The PCB may include physical couplers that facilitate the electrical coupling, where such physical couplers may introduce a vector at which particulates (e.g., dust) and water may enter one or more of top housing assembly 102 and bottom housing assembly 104 that may impact operation of the electrical components supporting operation of foldable smartphone 100.

As another example, the PCB may result in reduced support directly over the PCB along folding mechanism 106, as the PCB may impact (e.g., interfere with) support structures of folding mechanism. That is, the PCB may be designed with slack (or, in other words, excess length) to accommodate folding of top housing assembly 102 relative to bottom housing assembly 104 (as the curvature resulting from folding top housing assembly 102 relative to bottom housing assembly 104 requires additional length in the PCB relative to when top housing assembly 102 is open relative to bottom housing assembly 104). This excess slack may require bending the PCB between the supports of folding mechanism 106, which applies pressure to the supports of folding mechanism 106 that reduce pressure to the foldable display (particularly when top housing assembly 102 is open relative to bottom housing assembly 104). Users of foldable smartphone 100 may identify the reduced support through interactions with the foldable display along folding mechanism 106 and directly above the PCB running across folding mechanism 106, which may detract from the user experience (and potentially induce a perception of a faulty or poorly built device that may result in slower adoption of foldable smartphone 100).

Alternatively, or in conjunction with the excess length extending between the supports of folding mechanism 106, the excess length of the PCB may be configured to be stored in either or both of top housing assembly 102 and/or bottom housing assembly 104 to avoid overly impacting the support structures of folding mechanism 106. However, storing the excess length of the PCB in either or both top housing assembly 102 and/or bottom housing assembly 104 may reduce storage capacity of either or both top housing assembly 102 and/or bottom housing assembly 104 which otherwise may be used for electrical components (such as a larger battery to improve mobile operating use durations).

In accordance with various aspects of the techniques described in this disclosure, foldable smartphone 100 may include a flexible electrical inter-assembly coupling circuit 108 (e.g., a flexible PCB) that is configured to remain flat (with little to no bend or, in other words, no excess length) when top housing assembly 102 is open relative to bottom housing assembly 104 and flex (e.g., stretch) when top housing assembly 102 is closed relative to bottom housing assembly 104. In other words, rather than include a PCB (for interconnecting the subsets of electrical components in both housing assemblies 102/104) that is sufficiently wide enough to accommodate folding around folding mechanism 106 when closed (as the curvature around folding mechanism 106 requires additional length for the PCB compared to a PCB that could be used when the foldable mobile computing device is open), folding smartphone 100 may include flexible PCB 108 that flexes (or, in other words, stretches) to accommodate the fold around folding mechanism 106.

By avoiding use of a PCB that is wide enough to accommodate the folding mechanism, foldable smartphone 100 may not have to accommodate the extra width required to span folding mechanism 106 when folding. Removal of the extra width may increase storage capacity in one or both of housing assemblies 102/014 that can be used for components (such as providing increased storage capacity for a larger battery). Furthermore, removing the extra length may reduce areas in which particulates (such as water, dust, etc.) may enter one or both of housing assemblies 102/104. Moreover, removing the extra width may improve user interactions with the device as support structures of the folding mechanism 106 that support portions of the display located over folding mechanism 106 may not have to accommodate the extra width and thereby may present a more uniform surface that does not include weak spots along the axis of folding mechanism 106.

In operation, flexible PCB 108 may electrically couple the first subset of electrical components in top housing assembly 102 and the second subset of electrical components in bottom housing assembly 104. As noted above, flexible PCB 108 may remain flat (with little to no bend, or in other words excess length) when top housing assembly 102 is open relative to bottom housing assembly 104, and flex (or, in other words, stretch) when top housing assembly 102 is at least partially closed relative to bottom housing assembly 104.

Flexible PCB 108 may include a number of cuts 110 according to a flex geometry (which is shown in the example of FIG. 1 as a regular mesh of cuts, or in other words, holes) that enable flexible PCB 108 to remain flat when top housing assembly 102 is open relative to bottom housing assembly 104 and flex (or in other words, stretch) when top housing assembly 102 is closed relative to bottom housing assembly 104. While cuts 110 are shown as a regular mesh pattern in the example of FIG. 1, flexible PCB 108 may include cuts 110 according to other flex geometries, such as irregular flex geometries. Moreover, cuts 110 are shown as elongated slits in flexible PCB 108, but cuts 110 may be of any shape or size and may generally represent an absence of PCB in a regular, an irregular, or other pattern that facilitates stretching of flexible PCB 108.

Flexible PCB 108 may include two or more electrical couplers (such as electrical couplers 112A-112D) positioned at different locations along flexible PCB 108. Such electrical couplers 112A-112D ("electrical couplers 112") may couple to electrical receptacles of the subset of electrical components housed by top housing assembly 102 and the subset of electrical components housed by bottom housing assembly 104, where such electrical couplers 112 are electrically coupled to at least one other of electrical couplers 112 via traces (which may also be referred as "electrical traces") disposed on flexible PCB 108 (which are not shown in the example of FIG. 1 for ease of illustration purposes). Electrical couplers 112 may be used to interconnect different functions (referring to functions performed by various of the electrical components), such as battery/charging or imaging.

By virtue of stretching, flexible PCB 108 may not require an extra width to accommodate the curvature around folding mechanism 106, thereby potentially removing any impact on the support structures of folding mechanism 106. Moreover, flexible PCB 108 may not, again by virtue of stretching, require any excess space within either of top housing assembly 102 or bottom housing assembly 104, thereby providing additional space for the electrical components (e.g., more space for housing a larger battery compared to batteries used in a similarly sized housing assembly that stores the extra width of the PCB). As described in more detail below, flexible PCB 108 may also reduce the likelihood of particulates and/or water from entering either of top housing assembly or bottom housing assembly, while also promoting a better user experience in terms of reducing user detection of weak or soft points (partially due to PCB 108 remaining flat when top housing assembly 102 is open relative to bottom housing assembly 104 and additionally due to not impacting the support structures of folding mechanism 106).

Figure 2:
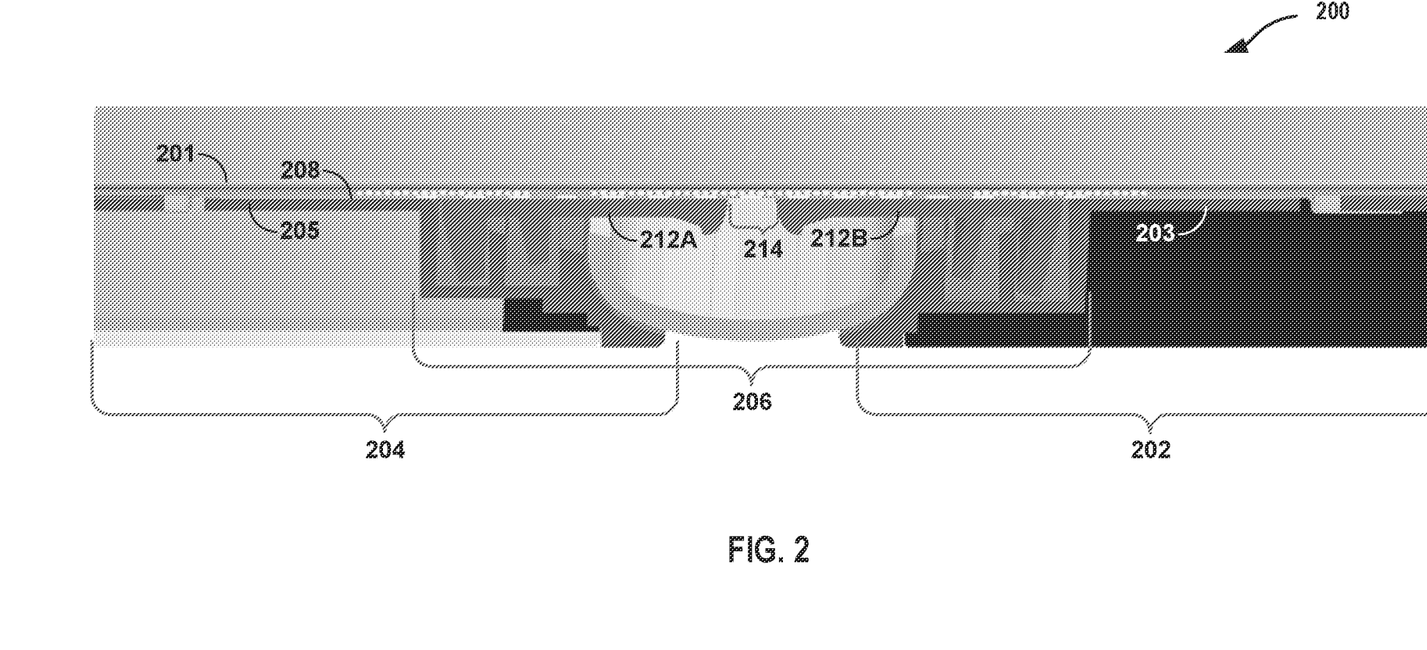
FIG. 2 is a diagram illustrating a side-view of the foldable smartphone of FIG. 1 in which a flexible printed circuit board provided in accordance with various aspects of the techniques described in this disclosure is arranged relative to support structures of a folding mechanism.

FIG. 2 is a diagram illustrating a side-view of the foldable smartphone of FIG. 1 in which a flexible printed circuit board provided in accordance with various aspects of the techniques described in this disclosure is arranged relative to support structures of a folding mechanism. Foldable smartphone 200 may represent an example of smartphone 100, where foldable smartphone 200 includes a top housing assembly 202, bottom housing assembly 204, and folding mechanism 206 that each represent respective examples of top housing assembly 102, bottom housing assembly 104, and folding mechanism 106. In the example of FIG. 2, foldable smartphone 200 includes a display 201 overlaid on top of flexible PCB 208 (which is an example of flexible PCB 108) that is adhered (at least partially) to a back (or in other words, underside) of display 201 and (at least partially) to an interior face 203 of top housing assembly 202 and an interior face 205 of bottom housing assembly 204.

Flexible PCB 208 may, as shown in the example of FIG. 2, spans the width and length of the foldable display (and also spans at least the width of folding mechanism 206 and a majority of the length of folding mechanism 206), where portions of flexible PCB 208 adjacent to the folding mechanism 206 are adhered in the manner described above along a majority of the length of folding mechanism 206 so as to create a barrier. In this respect, flexible PCB 208 may include a barrier that reduces contact of one or more particulates and water with the subset of electrical components housed by top housing assembly 202 and the subset of electrical components housed by bottom housing assembly 204. The barrier may, in other words, represent a waterproof barrier that prevent entry of water (and particulates, such as dust, sand, etc.).

As further shown in the example of FIG. 2, folding mechanism 206 may include support structures 212A and 212B ("support structures 212") that mechanically support flexible PCB 208 and display 201 when top housing assembly 202 is open relative to bottom housing assembly 204. Flexible PCB 208, by virtue of remaining flat with no extra width or length (depending on the perspective, which may refer to how width and length may change based on perspective) when top housing assembly 202 is open relative to bottom housing assembly 204, does not impact support structures 212 or require any cutouts in support structures 212 to accommodate the extra width (which would otherwise bend into the cutout of the support structures when top housing assembly 202 is open relative to bottom housing assembly 204). In this example, flexible PCB 208 may allow support structures 212 to provide improved support to display 201 in contrast to support structures that feature cutouts to accommodate the extra width of other types of PCBs.

That is, support structures 212 may run nearly the entire length (e.g., 90% or more) of folding mechanism 206 without having any cutouts or holes to accommodate the excess length. Such support structures 212 may additionally, as a result of not having to accommodate the extra width, be designed with a minimal gap 214 between support structures 212. Gap 214 is aligned generally along a middle line (within manufacturing tolerances) down a length of folding mechanism 206, where gap 214 may be less than equal to approximately three (3) millimeters as three millimeters is approximately what a user may detect through interactions with display 201 as a weak spot.

Figure 3A:
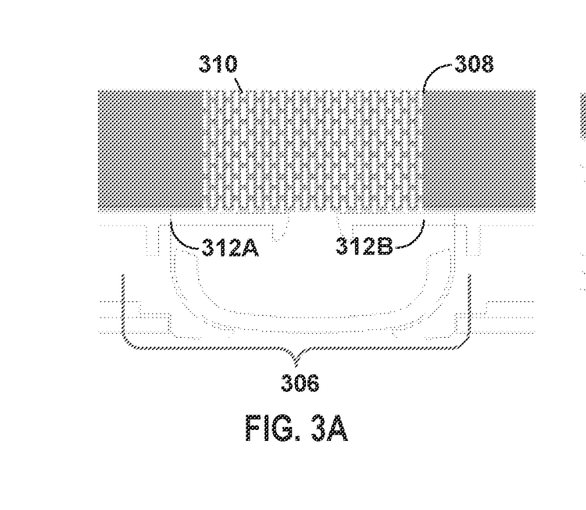
FIGS. 3A-3D are diagrams illustrating a sequence in which the flexible printed circuit board of FIG. 2 stretches to accommodate the top housing assembly closing with respect to the bottom housing assembly in accordance with various aspects of the techniques described in this disclosure.

FIGS. 3A-3E are diagrams illustrating a sequence in which the flexible printed circuit board of FIG. 2 stretches to accommodate the top housing assembly closing with respect to the bottom housing assembly in accordance with various aspects of the techniques described in this disclosure. In the example of FIG. 3A, flexible PCB 308 may represent an example of flexible PCB 108 shown in FIG. 1 and/or flexible PCB 208 shown in the example of FIG. 2, where flexible PCB 308 is flat and fully supported by support structures 312A/312B ("support structures 312") of folding mechanism 306 (which is an example of folding mechanism 106/206) as described above (when top housing assembly is open relative to bottom housing assembly), where flexible PCB 308 does not include an extra width or length to accommodate the curvature when the top housing assembly is closed relative to the bottom housing assembly.

Figure 3B:
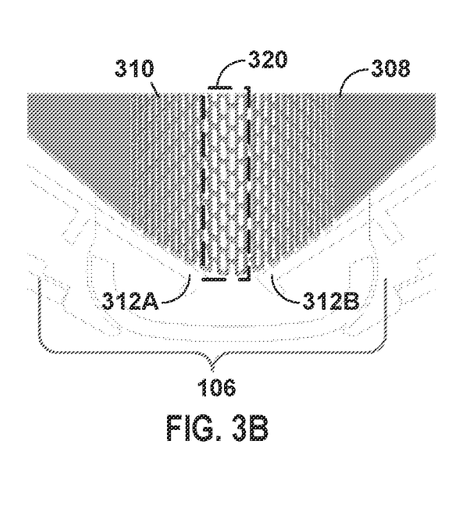

In the example of FIG. 3B, top housing assembly is partially closed relative to bottom housing assembly, which bends flexible PCB 308, pulling cuts 310 (which may be similar to cuts 110) along the middle axis and adjacent portions of folding mechanism 306 wider. In other words, cuts 310 generally around portion 320 of flexible PCB 308 may stretch to accommodate the curvature created when the top housing assembly is partially closed relative to the bottom housing assembly.

Figure 3C:
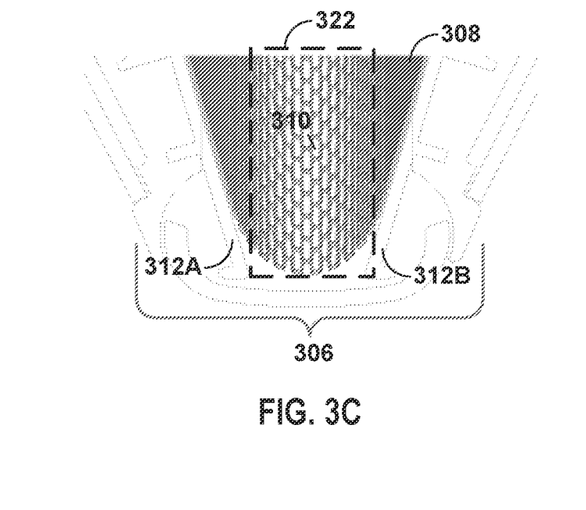

In the example of FIG. 3C, the top housing assembly is almost fully closed relative to the bottom housing assembly, which increasingly bends (relative to the example shown in FIG. 3B) flexible PCB 308, pulling cuts 310 along a wider (again compared to the example shown in FIG. 3B) portion 322 of flexible PCB 308 wider. Each of cuts 310 may stretch further to accommodate the curvature created when the top housing assembly is almost fully closed relative to bottom housing assembly.

Figure 3D:
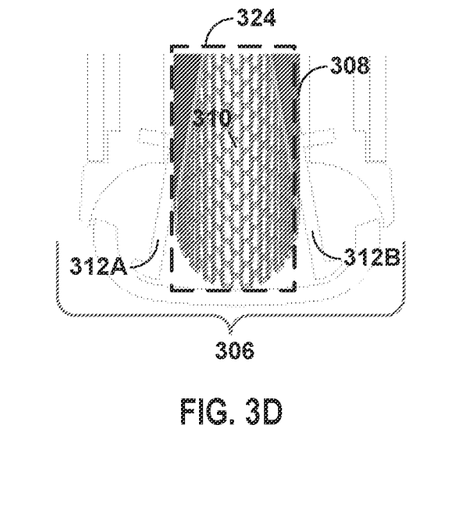

In the example of FIG. 3D, the top housing assembly is closed relative to the bottom housing assembly resulting in cuts 310 being stretched along portion 324 of flexible PCB 308. Throughout the examples of FIGS. 3A-3D, support structures 312 retract when the top housing assembly is closed relative to the bottom housing assembly.

Figure 4:
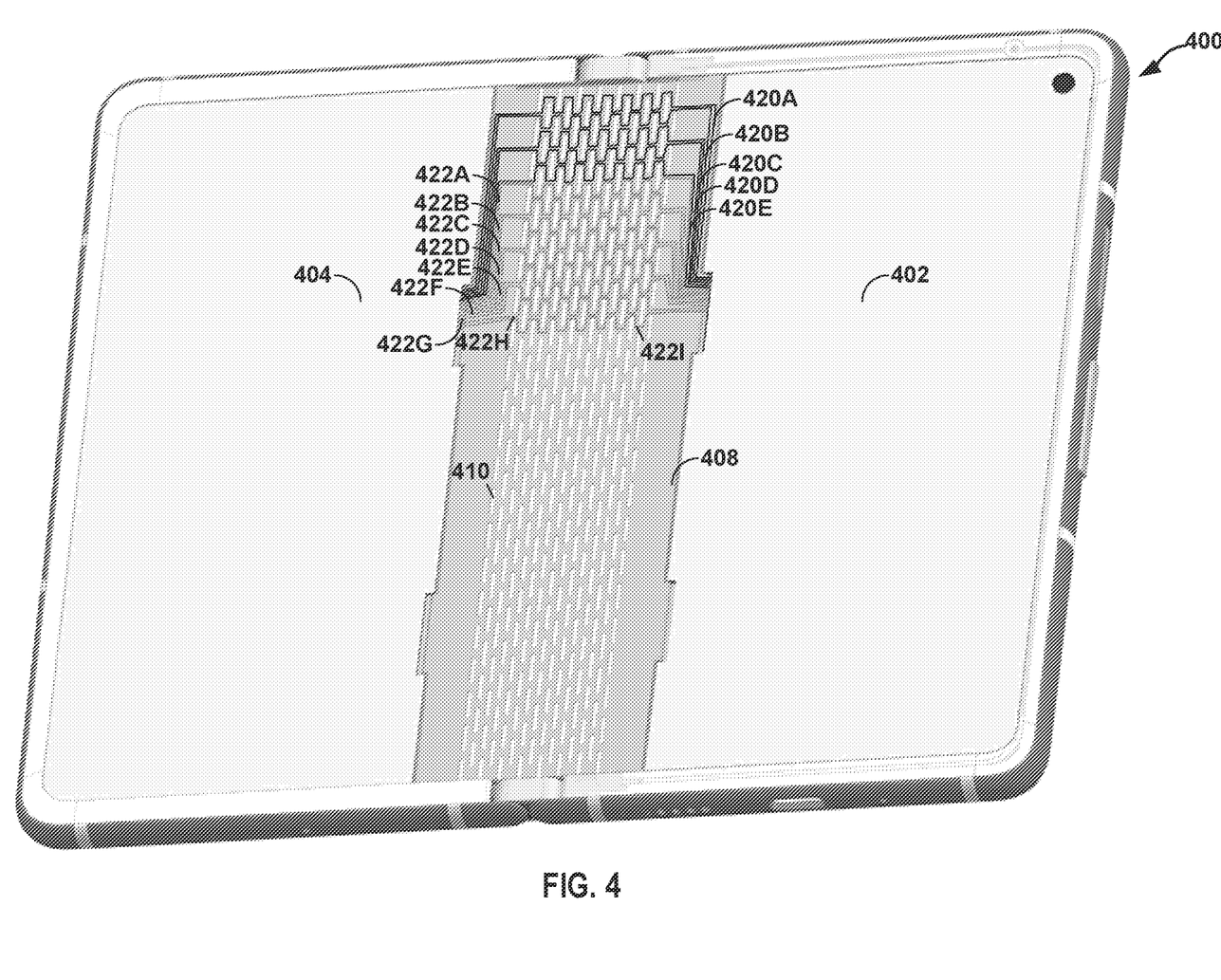
FIG. 4 is a diagram illustrating an example of the foldable smartphone having a flexible printed circuit board with sacrificial ground traces according to various aspects of the techniques described in this disclosure.

FIG. 4 is a diagram illustrating an example of the foldable smartphone having a flexible printed circuit board with sacrificial ground traces according to various aspects of the techniques described in this disclosure. In the example of FIG. 4, foldable smartphone 400 (which may represent another example of foldable smartphone 100 shown in the example of FIG. 1) includes flexible PCB 408 (which may represent an example of flexible PCB 108 shown in the example of FIG. 1), where flexible PCB 408 includes sacrificial electrical ground traces 420A-420E ("ground traces 420") and electrical data traces 422A-422I ("data traces 402"). Traces 420/422 may represent examples of electrical traces, and as such may be referred to herein as electrical traces 420 and/or electrical traces 422.

Traces 420 and 422 may be disposed on flexible PCB 408 by jogging or, in other words, routing traces 420 and 422 back and forth around alternative cuts 410 (which may represent an example of cuts 110), where cuts 410 and resulting signal (which is another way to refer to traces 420 and 422) may be adjusted to accommodate different flex geometries. Sacrificial ground traces 420 may include a number of redundant ground traces 420 that are configured to fail over time due to repeated opening and closing of top housing assembly 402 (which is an example of top housing assembly 102) relative to bottom housing assembly 404 (which is an example of bottom housing assembly 404) without impacting the electrical coupling of the subset of electrical components housed by top housing assembly 402 and the subset of electrical components housed by bottom housing assembly 404. In other words, at locations of flexible PCB 408 prone to higher stress, one or more sacrificial ground traces 420 may be disposed on flexible PCB 408 (and likely multiple sacrificial ground traces 420) to ensure an adequate electrical coupling of the electrical components housed in both top housing assembly 402 and bottom housing assembly 404 remain electrically coupled (with a secure ground connection) despite repeated opening and closing of top housing assembly 402 relative to bottom housing assembly 404.

As such, one or more of sacrificial ground traces 420 may fail over time due to repeated opening and closing of top housing assembly 402 relative to bottom housing assembly 404. However, so long as one of sacrificial ground traces 420 is unbroken or, in other words, capable of conducting electricity, the electrical coupling between the subset of electrical components housed in top housing assembly 402 and the subset of electrical components housed in bottom housing assembly 404 may remain functional and thereby allow electrical communication via data traces 422.

Figure 5:
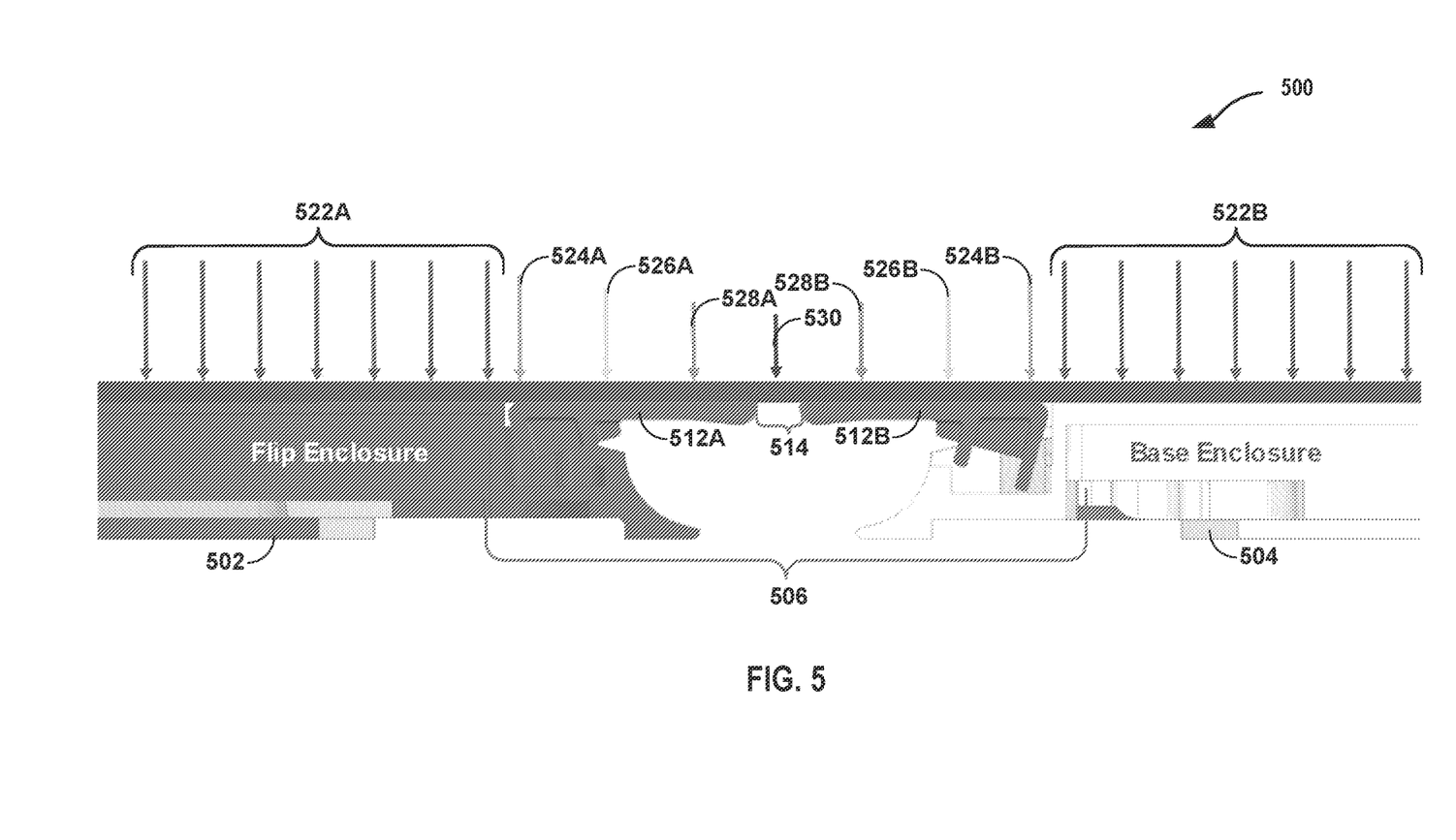
FIG. 5 is a diagram illustrating a seamless transition between the top housing assembly and bottom housing assembly over folding mechanism of the foldable smartphone in accordance with various aspects of the techniques described in this disclosure.

FIG. 5 is a diagram illustrating a seamless transition between the top housing assembly and bottom housing assembly over folding mechanism of the foldable smartphone in accordance with various aspects of the techniques described in this disclosure. In the example of FIG. 5, a foldable smartphone 500 may represent an example of foldable smartphone 100 shown in the example of FIG. 1 in which support structures 512A and 512B ("support structures 512") of folding mechanism 506 (which may represent an example of support structures 212 and folding mechanism 106 respectively) included within foldable smartphone 500 may present a gradual decline of support, which is denoted by arrows 524A-530 (which may also be referred to as resistance 524A-530).

Top housing assembly 502 (which may represent an example of top housing assembly 102) may provide a high level of resistance 522A (relative to resistance 524A-530), while bottom housing assembly 504 (which may represent an example of bottom housing assembly 104) may provide a similar, if not substantially similar, high level of resistance 522B. Support structures 512 may provide a seamless transition (from a user perspective in terms of detecting different levels of resistance) along the width of support structures 512 in which resistance 524A/524B is slightly (e.g., about 5%-10%) less than resistance 522A/522B, resistance 526A/526B is slightly (e.g., about 5%10%) less than resistance 524A/524B, resistance 528A/528B is slightly (e.g., about 5%-10%) less than resistance 526A/526B, and resistance 530 is slightly (e.g., about 5%10%) less than resistance 528A/528B.

In this respect, support structures 512 may not provide a uniform stiffness (or resistance) but instead provide a graduated resistance that avoids sudden changes in resistance. Support structures 512 may be designed to avoid such sudden changes in resistance, especially at the transition between housing assemblies 502/504 and folding mechanism 506. Support structures 512 may taper towards the center (of folding mechanism 506—or in other words, at gap 514), leading to potentially a smooth perceived feel because there are no sudden changes in stiffness (again, which may be another way to refer to resistance) when a user runs a finger side to side over the width of folding mechanism 506.

As such, various aspects of the techniques may enable the following examples.

Example 1. A device comprising: a top housing assembly configured to house a first subset of a plurality of electrical components, a bottom housing assembly mechanically coupled to the top housing assembly such that the top housing assembly is operable to cover, when closed, at least a portion of the bottom housing assembly, the bottom housing assembly configured to house a second subset of the plurality of electrical components; and a flexible electrical inter-assembly coupling circuit configured to electrically couple the first subset of the plurality of electrical components and the second subset of electrical components, the flexible electrical intercoupling circuit configured to remain flat when the top housing assembly is open relative to the bottom housing assembly and flex when the top housing assembly is at least partially closed relative to the bottom housing assembly.

Example 2. The device of example 1, wherein the flexible electrical inter-assembly coupling circuit includes one or more electrical traces dispersed on a material including one or more cuts that provide the flex when the top housing assembly is at least partially closed relative to the bottom housing assembly.

Example 3. The device of any combination of examples 1 and 2, further comprising a folding mechanism that mechanically couples the top housing assembly to the bottom housing assembly to facilitate opening and closing of the top housing assembly relative to the bottom housing assembly.

Example 4. The device of example 3, wherein the flexible electrical inter-assembly coupling circuit spans at least a majority of a length of the folding mechanism.

Example 5. The device of any combination of examples 3 and 4, wherein the flexible electrical inter-assembly coupling circuit spans a width of the folding mechanism.

Example 6. The device of any combination of examples 1-5, wherein the device further includes a foldable display that spans at least a first portion of the top housing assembly and a second portion of the bottom housing assembly.

Example 7. The device of example 6, wherein the flexible electrical inter-assembly coupling circuit spans a width and a length of the foldable display.

Example 8. The device of any combination of examples 1-7, wherein the flexible electrical inter-assembly coupling circuit includes a barrier that reduces contact of one or more of particulates and water with the first subset of the plurality of electrical components and the second subset of the plurality of electrical components.

Example 9. The device of example 8, wherein the barrier adheres to a back of a foldable display and one or more of an interior of the top housing assembly and an interior of the bottom housing assembly.

Example 10. The device of any combination of examples 1-9, wherein the flexible electrical inter-assembly coupling circuit includes a material on which sacrificial ground traces are disposed at locations within the material that are designed to fail over time due to repeated opening and closing of the top housing assembly relative to the bottom housing assembly without impacting the electrical coupling of the first subset of electrical components and the second subset of electrical components.

Example 11. The device of any combination of examples 1-10, further comprising: a folding mechanism that mechanically couples the top housing assembly to the bottom housing assembly; and a foldable display that spans the folding mechanism and at least a first portion of the top housing assembly and a second portion of the bottom housing assembly, wherein the folding mechanism includes one or more support structures that support each of a portion of the flexible electrical inter-assembly coupling circuit and a portion of the foldable display positioned over the folding mechanism.

Example 12. The device of example 11, wherein the one or more support structures provide more support at an edge of the folding mechanism compared to the middle of the folding mechanism.

Example 13. The device of example 11, further comprising wherein the one or more support structures provide approximately a same amount of support at an edge of the folding mechanism compared a portion of the foldable display positioned adjacent to the edge of the folding mechanism.

Example 14. The device of example 11, wherein the one or more support structures include two support structures arranged such that there is a gap between the two support structures aligned approximately along a middle line down a length of the folding mechanism.

Example 15. The device of example 14, wherein the gap is less than or equal to approximately three millimeters.

Example 16. The device of any combination of examples 1-15, wherein the flexible electrical inter-assembly coupling circuit includes two or more electrical couplers, each of the two or more electrical couplers positioned at different locations along the flexible electrical inter-assembly coupling circuit.

Example 17. The device of any combination of examples 1-16, wherein the flexible electrical inter-assembly coupling circuit does not include an additional slack portion to enable the flexible electrical inter-assembly coupling circuit to accommodate closure of the top housing assembly relative to the bottom housing assembly.

Examples 18. The device of any combination of examples 1-17, wherein the flexible electrical inter-assembly coupling circuit is configured to stretch when the top housing assembly is at least partially closed relative to the bottom housing assembly.

Examples 19. The device of any combination of examples 1-18, wherein the flexible electrical inter-assembly coupling circuit includes a flexible printed circuit board.

Example 20. The device of any combination of examples 1-18, wherein the flexible electrical inter-assembly coupling circuit includes a flexible printed circuit board with electrical traces disposed on a material having cuts according to a flex geometry that enable the flexible printed circuit board to remain flat when the top housing assembly is open relative to the bottom housing assembly and flex when the top housing assembly is at least partially closed relative to the bottom housing assembly.

Various aspects have been described in this disclosure. These and other aspects are within the scope of the following claims.

The invention claimed is:
1. A device comprising:
a top housing assembly configured to house a first subset of a plurality of electrical components;
a bottom housing assembly mechanically coupled to the top housing assembly;
a folding mechanism that mechanically couples the top housing assembly to the bottom housing assembly for opening and closing the top housing assembly relative to the bottom housing assembly, wherein the top housing assembly is configured to cover, when closed, at least a portion of the bottom housing assembly, the bottom housing assembly configured to house a second subset of the plurality of electrical components; and
a flexible electrical inter-assembly coupling circuit configured to electrically couple the first subset of the plurality of electrical components and the second subset of electrical components, the flexible electrical inter-assembly coupling circuit configured to remain flat when the top housing assembly is open relative to the bottom housing assembly and stretch when the top housing assembly is at least partially closed relative to the bottom housing assembly,
wherein the flexible electrical inter-assembly coupling circuit includes one or more electrical traces dispersed on a material including one or more cuts that stretch when the top housing assembly is at least partially closed relative to the bottom housing assembly.

2. The device of claim 1, wherein the flexible electrical inter-assembly coupling circuit spans at least a majority of a length of the folding mechanism.

3. The device of claim 1, wherein the flexible electrical inter-assembly coupling circuit spans a width of the folding mechanism.

4. The device of claim 1, wherein the device further includes a foldable display that spans at least a first portion of the top housing assembly and a second portion of the bottom housing assembly.

5. The device of claim 4, wherein the flexible electrical inter-assembly coupling circuit spans a width and a length of the foldable display.

6. The device of claim 1, wherein the flexible electrical inter-assembly coupling circuit includes a barrier that reduces contact of one or more of particulates and water with the first subset of the plurality of electrical components and the second subset of the plurality of electrical components.

7. The device of claim 6, wherein the barrier adheres to a back of a foldable display and one or more of an interior of the top housing assembly and an interior of the bottom housing assembly.

8. The device of claim 1, wherein the flexible electrical inter-assembly coupling circuit includes a material on which redundant ground traces are disposed at locations within the material that are designed to fail over time due to repeated opening and closing of the top housing assembly relative to the bottom housing assembly.

9. The device of claim 1, further comprising:
a foldable display that spans the folding mechanism and at least a first portion of the top housing assembly and a second portion of the bottom housing assembly, wherein the folding mechanism includes one or more support structures that support each of a portion of the flexible electrical inter-assembly coupling circuit and a portion of the foldable display positioned over the folding mechanism.

10. The device of claim 9, wherein the one or more support structures provide more support at an edge of the folding mechanism compared to the middle of the folding mechanism.

11. The device of claim 9, further comprising wherein the one or more support structures provide a same amount of support at an edge of the folding mechanism compared a portion of the foldable display positioned adjacent to the edge of the folding mechanism.

12. The device of claim 9, wherein the one or more support structures include two support structures arranged such that there is a gap between the two support structures aligned along a middle line down a length of the folding mechanism.

13. The device of claim 12, wherein the gap is less than or equal to approximately three millimeters.

14. The device of claim 1, wherein the flexible electrical inter-assembly coupling circuit includes two or more electrical couplers, each of the two or more electrical couplers positioned at different locations along the flexible electrical inter-assembly coupling circuit.

15. The device of claim 1, wherein the flexible electrical inter-assembly coupling circuit does not include an additional slack portion.

16. The device of claim 1, wherein the flexible electrical inter-assembly coupling circuit includes a flexible printed circuit board.

17. The device of claim 1, wherein the flexible electrical inter-assembly coupling circuit includes a flexible printed circuit board with electrical traces disposed on the material having the cuts according to a flex geometry, wherein the flexible printed circuit board remains flat when the top housing assembly is open relative to the bottom housing assembly and flexes when the top housing assembly is at least partially closed relative to the bottom housing assembly.

* * * * *